Patented Aug. 17, 1943

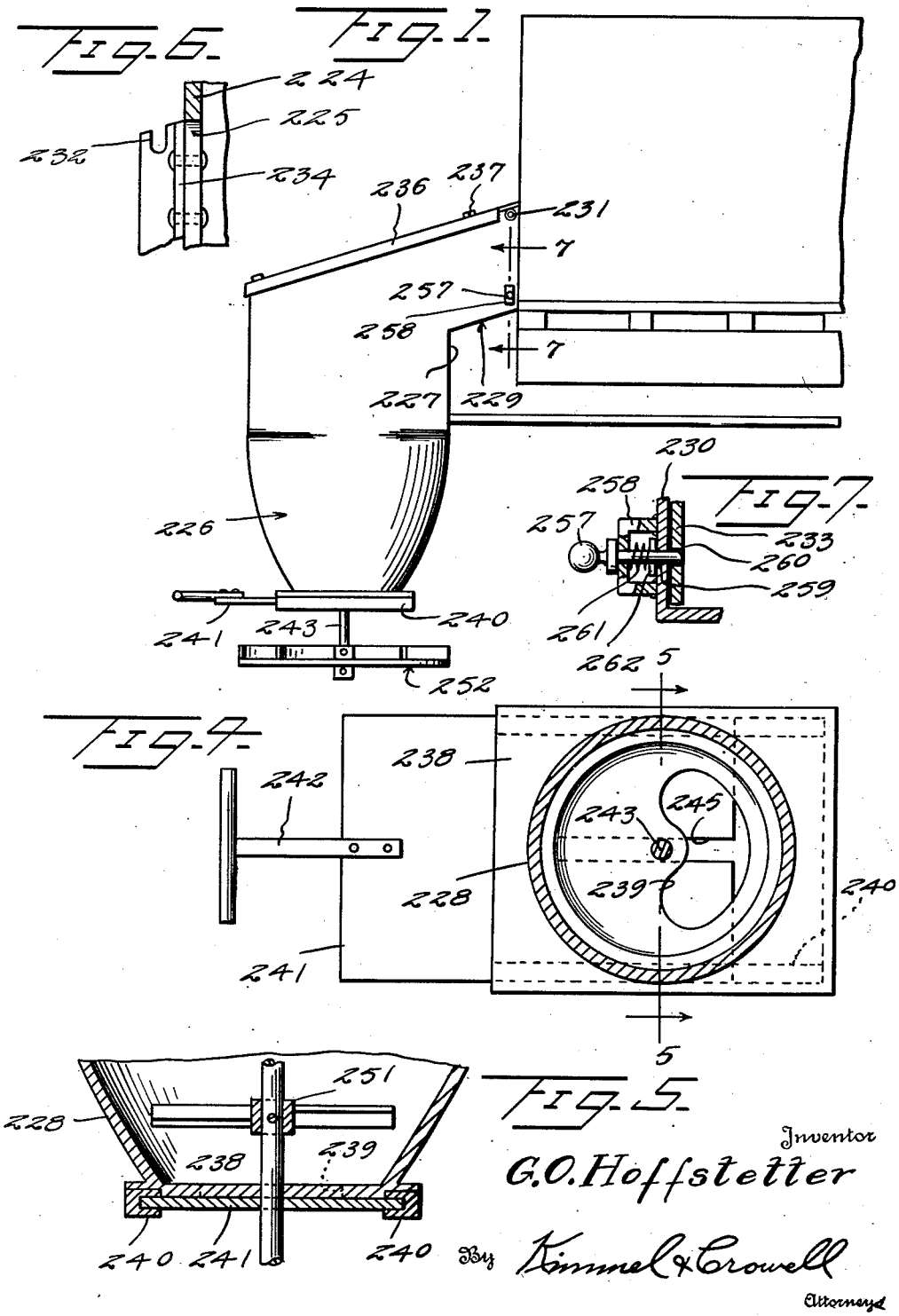

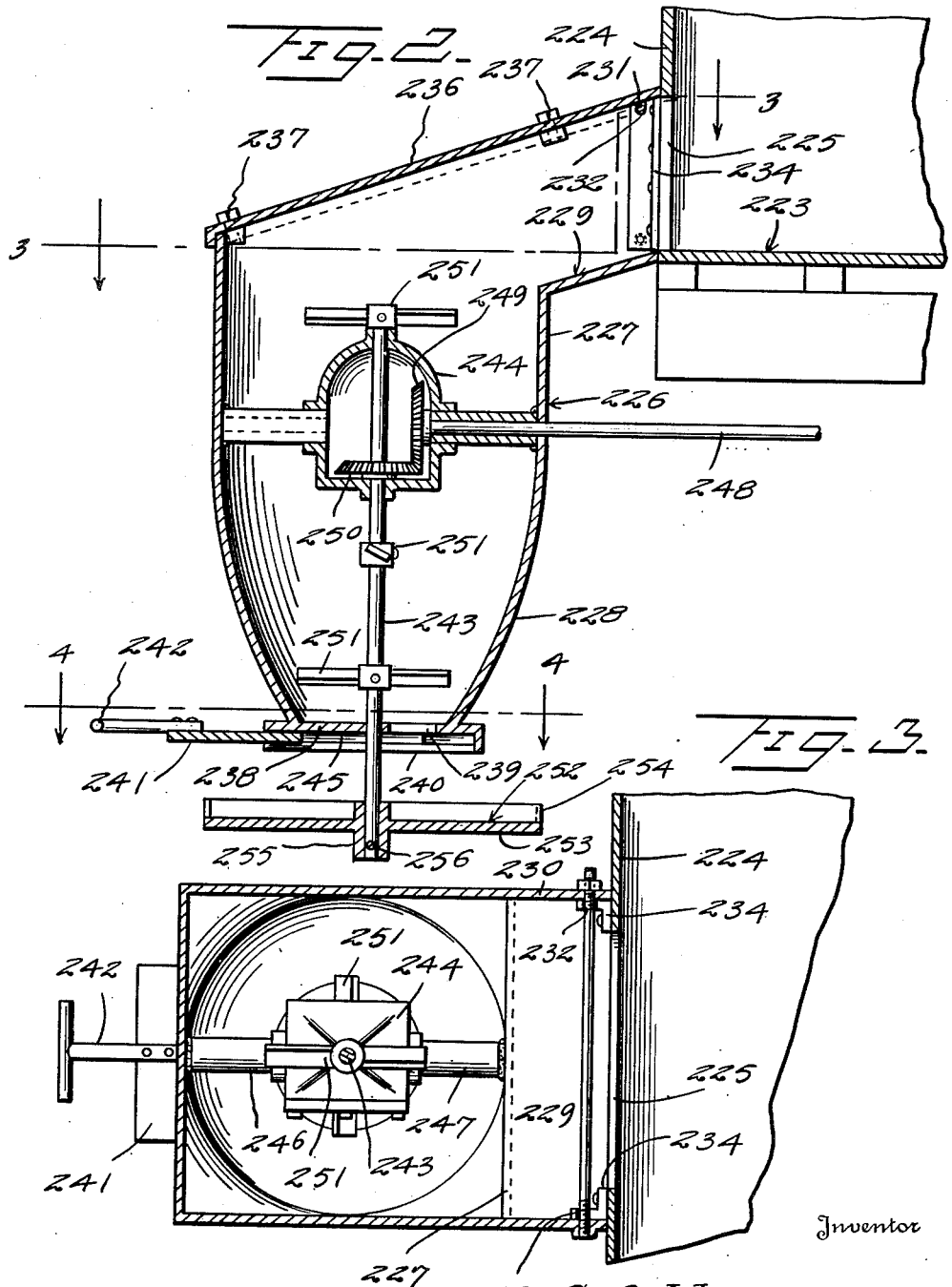

2,327,266

UNITED STATES PATENT OFFICE 2,327,266

MATERIAL SPREADING DEVICE

George O. Hoffstetter, Jerseyville, Ill.

Original application July 7, 1941, Serial No. 401,362. Divided and this application February 18, 1942, Serial No. 431,419

3 Claims. (Cl. 275—8)

This invention relates to material spreading or broadcasting devices.

This invention is a division of my co-pending application Serial Number 401,362, filed July 7, 1941, for Material spreading devices.

An object of this invention is to provide a spreading apparatus for spreading or broadcasting a fertilizer, such as lime, or other granular, comminuted or crushed material, the spreading structure being attachable to a truck or other vehicle and being connected with the power take-off of the truck or other power device.

Another object of this invention is to provide a device of this kind which will discharge the material in a relatively wide path.

A further object of this invention is to provide a device of this kind which is capable of spreading either dry or moist material.

A further object of this invention is to provide an improved hopper for holding the material and an improved means for agitating the material in the lower portion of the hopper so that the material will be in a condition to be readily discharged from the hopper.

A further object of this invention is to provide an improved spreader unit which is so constructed that it may be readily removed from the hopper structure for repair or replacement of the parts thereof.

A further object of this invention is to provide as a new article of manufacture a spreader unit for detachable mounting on the end gate of a truck body, the unit being operatively coupled with the power take-off of the truck.

A further object of this invention is to provide in a detachable spreader unit for a truck body, an improved means for mounting the unit on the end gate of the truck so that the unit may be quickly and easily mounted on or removed from the truck without the use of tools.

To the foregoing objects and others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail side elevation, partly broken away, of a material spreading apparatus constructed according to an embodiment of this invention, Figure 2 is a vertical section of the structure shown in Figure 1, Figure 3 is a sectional view taken on line 3—3 of Figure 2, Figure 4 is a sectional view taken on line 4—4 of Figure 2, Figure 5 is a fragmentary sectional view taken on the line 5—5 of Figure 4, Figure 6 is a fragmentary side elevation of the supporting structure for the attachment, and Figure 7 is a sectional view taken on the line 7—7 of Figure 1.

Referring to the drawings, there is disclosed a preferred embodiment of this invention in the form of a distributor or spreader attachment for the rear end of a truck body. The truck body is shown fragmentarily in Figures 1, 2 and 3 and is generally designated as 223. The body 223 includes a rear wall 224 which is formed with an opening 225 through which the material, in the form of lime or the like, may be discharged. Preferably, the material may be shoveled into an opening 225, and this material will then drop downwardly into a hopper, generally designated as 226. The hopper 226 includes an upper hopper body 227 which is substantially rectangular in plan, and a lower hopper body 228 of substantially inverted dome-shaped configuration. The upper body 227 is formed with a forwardly projecting chute 229 which is adapted to register with the discharge opening 225. The side walls 230 of the chute 229 have secured thereto a transversely disposed supporting member 231 in the form of a pipe or elongated bar which is adapted to engage in an upwardly opening notch 232 carried by the rearwardly projecting side 233 of an angle member 234. There are two of these angle members 234 secured by fastening devices 235 to the gate or rear wall 224 and the rearwardly projecting sides 233 are adapted to engage against the inner faces of the side walls 230 of the chute 229. The upper portion of the hopper 226 is preferably closed by means of a closure plate 236 which also engages over the top of the chute 229 and is secured to the hopper body 226 and the chute 229 by fastening devices 237.

The lower hopper body 228 is formed with a bottom wall 238 having a delivery or discharge opening 239 in the forward portion thereof. The bottom wall 238 preferably projects outwardly beyond the lower portion of the hopper body 228, as shown in Figure 2 and has secured to the under side thereof a pair of channel-shaped guide members 240 within which a slidable valve 241 engages. The rear portion of the valve 241 may be provided with a handle structure 242 so that the valve structure 241 may be manually operated to either open or close the discharge or delivery opening 239.

A vertically disposed distributor shaft 243 is rotatably disposed in the hopper member 226, being journalled in a gear housing 244. The shaft 243 projects downwardly below the housing 244 and through the bottom wall 232. Preferably, the valve member 241 is formed with an elongated slot 245 which engages on opposite sides of the shaft 243 so as to permit the sliding movement of the valve member 241. The gear housing 244 is supported within the hopper body 226 by means of a pair of supporting members 246 and 247. The supporting member 247 is preferably hollow and constitutes a bearing for the drive shaft 248. The drive shaft 248 is adapted to be connected to a suitable power take-off forming part of the truck structure 223. The rear end portion of the shaft 248 has fixed thereto a bevel gear 249 which meshes with a bevel gear 250 fixed to the vertical shaft 243. The gears 249 and 250 are rotatable within the gear housing 244. A plurality of superposed agitator blades 251 are fixed in vertical spaced relation on the shaft 243, and in the present instance, two of the blades 251 are disposed below the gear housing 244 and another or upper blade 251 is disposed on the upper end of the shaft 243. The lower end of the shaft 243 has fixed thereto a distributor member 252 including a disc-shaped plate 253 and a plurality of arcuate blades 254 fixed to the upper side of the plate 253. The central portion of the plate 253 is formed with a bushing 255 which may be fixed by fastening member 256 to the lower end of the shaft 243.

In order to provide a means whereby the hopper or spreader unit 226 may be securedly locked on the supporting angle members 234, I have provided a spring-pressed locking pin 257 which is slidable through a substantially U-shaped support or housing 258 fixed to a side 230 of the chute 229. There are two of these locking pins 257 adjacent the lower portions of the two side walls 230 of the chute 229 and each side wall 230 is formed with an opening 259 through which the pin 257 loosely engages. The rearwardly projecting side 233 is formed with an opening 260 adapted to register with the opening 259 so that the inner portion of the pin 257 may engage in the opening 260. The pin 257 is constantly urged to a locking position by means of a spring 261 which has one end thereof bearing against the bite of the U-shaped member 258 and the other end thereof bearing against a washer or pin 262 mounted on the pin 257.

In the use and operation of this device, the chute member 229 is so placed as to cover an opening in the end gate of an ordinary truck body. The material is shoveled or otherwise moved into the chute 229. The drive shaft 248 is connected to suitable power take-off means on the truck. The material as it falls through the hopper is disintegrated by the blades 251. The material then passes through the valve 241 and strikes a distributor member 252, which distributes the material over a considerable area.

What I claim is:

1. A spreader attachment for a truck body, comprising in combination a spreader unit, a chute carried by said unit and extending forwardly and upwardly therefrom, a pair of upright angle-shaped supporting members adapted to be fixed to said body, each member having a notch in the upper end of one side and an opening adjacent the lower portion thereof, a horizontal bar fixed to the upper portion of said chute and engageable in said notches, and spring-pressed locking members carried by said chute engageable in said openings for removably locking said unit on said supporting members.

2. In combination a truck body, a spreader unit, means detachably mounting said unit on said body and means connecting said unit with a power source, said unit including a hollow hopper body having a lower discharge opening and an upper intake opening in the forward side thereof, an upwardly inclined and forwardly extending chute extending from said intake opening, a horizontally slidable valve for controlling the discharge of material through said lower discharge opening, a gear housing in said body, a pair of horizontally aligned tubular members supporting said housing in substantially the vertical center of said body and spaced above said discharge opening, a vertical spreader shaft journalled in said housing and extending downwardly therefrom, said spreader shaft terminating at its lower end below said body and at its upper end above said housing, agitators fixed to said spreader shaft above and below said housing, a spreader on the lower end of said spreader shaft, a right angularly disposed drive shaft journalled in said housing and extending through one of said supporting members, and intermeshing gears carried by said shafts within said housing.

3. In combination a truck body, a spreader unit, means detachably mounting said unit on said body and means connecting said unit with a power source, said unit including a hollow hopper body having a lower discharge opening and an upper intake opening in the forward side thereof, an upwardly inclined and forwardly extending chute extending from said intake opening, a pair of upright angle members adapted to be fixed to said body, each member having a notch in the upper end thereof, a transverse bar carried by said chute and engaging in said notches, each member also having a keeper opening below said notches, spring-pressed locking bolts carried by said chute engageable in said keeper openings, a horizontally slidable valve for controlling the discharge of material through said lower discharge opening, a gear housing in said body, a pair of horizontally aligned tubular members, means supporting said housing in substantially the vertical center of said body and spaced above said discharge opening, a vertical spreader shaft journalled in said housing and extending downwardly therefrom, said spreader shaft terminating at its lower end below said body and at its upper end above said housing, agitators fixed to said spreader shaft above and below said housing, a spreader on the lower end of said spreader shaft, a right angularly disposed drive shaft journalled in said housing and extending through one of said supporting members and intermeshing gears carried by said shafts within said housing.

GEORGE O. HOFFSTETTER.